(12) United States Patent
Chiang

(10) Patent No.: US 6,198,467 B1
(45) Date of Patent: Mar. 6, 2001

(54) METHOD OF DISPLAYING A HIGH-RESOLUTION DIGITAL COLOR IMAGE ON A LOW-RESOLUTION DOT-MATRIX DISPLAY WITH HIGH FIDELITY

(75) Inventor: Tsung-Pei Chiang, Hsinchu Hsien (TW)

(73) Assignee: Unipac Octoelectronics Corp., Hsinchu (TW)

( * ) Notice: Subject to any disclaimer, the term of this patent is extended or adjusted under 35 U.S.C. 154(b) by 0 days.

(21) Appl. No.: 09/237,498

(22) Filed: Jan. 25, 1999

(30) Foreign Application Priority Data

Feb. 11, 1998 (TW) .................................. 87101856

(51) Int. Cl.$^7$ ...................................... G09G 5/00
(52) U.S. Cl. .......................................... 345/132; 345/154
(58) Field of Search .................. 345/3, 132, 133, 345/150, 152, 153, 154, 155, 87, 88

(56) References Cited

U.S. PATENT DOCUMENTS

| | | | |
|---|---|---|---|
| 4,771,279 | * | 9/1988 | Hannah ................................. 345/132 |
| 5,986,635 | * | 11/1999 | Naka et al. ............................ 345/132 |
| 6,023,262 | * | 2/2000 | Eglit ..................................... 345/132 |

* cited by examiner

Primary Examiner—Dennis-Doon Chow
(74) Attorney, Agent, or Firm—Jiawei Huang; J C Patents

(57) ABSTRACT

A method is provided for displaying an original high-resolution digital color image on a low-resolution color dot-matrix display such as a liquid crystal display (LCD). Generally speaking, the method is used to display an original digital color image of a resolution of A×B on a color display of a resolution of C×D, where A, B, C, D are positive integer numbers and A>C and B>D. The first step is to group the pixels of the original digital color image in a unit of E into a plurality of groups equal in number to the pixels in the color display, where E is a ratio value obtained by rounding up the result of the division of A by C to the nearest integer number. Each of the groups is matched to one pixel in the color display. From each group, a set of RGB values is respectively extracted from selected pixels in the group, in a featured RGB extraction method. The final step is then to drive each pixel in the color display to display a specific color corresponding to the assigned RGB values. This process is repeated until all the groups in the same horizontal line and all the horizontal lines in the original digital color image are matched to the pixels in the LCD. This method allows the resulting image on the low-resolution LCD to have high fidelity to the original high-resolution image.

17 Claims, 3 Drawing Sheets

METHOD OF DISPLAYING A HIGH-RESOLUTION DIGITAL COLOR IMAGE ON A LOW-RESOLUTION DOT-MATRIX DISPLAY WITH HIGH FIDELITY

CROSS-REFERENCE TO RELATED APPLICATION

This application claims the priority benefit of Taiwan application serial no. 87101856, filed Feb. 11, 1998, the full disclosure of which is incorporated herein by reference.

BACKGROUND OF THE INVENTION

1. Field of the Invention

This invention relates to digital color image display methods, and more particularly, to a method of displaying an original high-resolution digital color image on a low-resolution dot-matrix display such as an LCD.

2. Description of Related Art

Conventional displays for computers are typically composed of a rectangular array of a specific number of pixels. For instance, a VGA (Video Graphics Adapter) display includes a 640×480 array of pixels, an XGA (Extended Graphics Array) display includes a 1024×768 array of pixels, and an SVGA (Super Video Graphics Array) display includes a 1280×1024 array of pixels. The number of pixels on the display is also referred to as the resolution of the display. For color displays, each pixel is further composed of three dots, respectively used to display the three primary colors, i.e., red (R), green (G), and blue (B), in various intensities, that can be combined to show a specific color. Therefore, the number of dots on a color display is 3 times the resolution. In the case of a VGA display, for example, the total number of dots is 3×640×480=1920×480. By contrast, the LCD is a low-resolution display. An LCD consisting of a 280×220 array of dots, for example, can display monochrome images in a resolution of 280×220, but will display color images in a reduced resolution of only 93×220. This is because that in the latter case, three dots are used in combination to display the respective RGB components of a specific color; therefore 280/3≈93.

Conventional methods for displaying an original high-resolution digital color image on a low-resolution LCD require complex computations or direct sampling. To obtain the low-resolution image, the high-resolution image first undergoes an averaging process or is filtered to obtain the RGB values of each pixel in the low-resolution LCD. These RGB data are then used to drive the pixels of the LCD to display the image.

FIG. 1A is a flow diagram showing the procedural steps of a conventional method for displaying an originally high-resolution digital color image on a low-resolution LCD. In this method, the first step is to obtain the original high-resolution digital color image. The second step is to perform a complex computation process so as to transform the image data into a suitable form that can be displayed on the LCD. In the case of displaying an original 640×480 VGA color image on a 280×220 LCD, each pixel in the LCD represents a group of 7 pixels, where the number 7 is obtained by rounding up the value of 640/93 to the nearest integer number. Therefore, each group of 7 consecutive pixels on each horizontal line of the original high-resolution image is averaged in its RGB values. The third step is then to use the averaged RGB values to drive each corresponding pixel in the LCD.

FIG. 1B is a flow diagram showing the procedural steps of another conventional method for displaying an original high-resolution digital color image on a low-resolution LCD. In this method, the first step is to obtain the original high-resolution digital color image. Then, the second step is to perform a direct sampling process so as to transform the high-resolution image into a suitable form that can be displayed on the LCD. In the case of displaying an original 640×480 VGA color image on a 280×220 LCD, each pixel in the LCD represents a group of 7 pixels, where the number 7 is obtained by rounding up the value of 640/93 to the nearest integer number. This method differs from the previous method of FIG. 1A in that the RGB values of a particular pixel, for example the 4th one, in each group of 7 consecutive pixels in the original high-resolution image is selected as the RGB values of the corresponding pixel in the LCD. The third step is then to use the averaged RGB values to drive each corresponding pixel in the LCD.

The foregoing two conventional methods, however, are disadvantageous in utilization. For instance, the method of FIG. 1A requires very complex hardware/software means to perform the computations for the transformation, which makes the implementation cost quite high. In the method of FIG. 1B, the direct sampling process has the drawbacks of causing loss of details and abrupt changes in color rendition between neighboring pixels since the RGB values are extracted from one of the 7 pixels in each group. The resulting image displayed on the LCD is thus considerably lower in fidelity when compared to the original one.

SUMMARY OF THE INVENTION

It is therefore an objective of the present invention to provide a method for displaying an original high-resolution digital color image on a low-resolution LCD, which can overcome the drawback of the conventional method of FIG. 1A so as to allow the implementation cost to be reduced.

It is another objective of the present invention to provide a method for displaying an original high-resolution digital color image on a low-resolution LCD, which can overcome the drawback of the conventional method of FIG. 1A so as to allow the resulting image to be high in fidelity.

In accordance with the foregoing and other objectives of the present invention, a new method is provided for displaying an original high-resolution digital color image on a low-resolution color display such as an LCD. Broadly speaking, the method of the invention is used to display an original digital color image of a resolution of A by B pixels on a color display of a resolution of C by D pixels, where A, B, C, D are positive integer numbers and A>C and B>D. In the method of the invention, the first step is to group the pixels of the original digital color image in a unit of E into a plurality of groups equal in number to the pixels in the low-resolution color display, where E is a ratio value obtained by rounding up the result of the division of A by C to the nearest integer number. Then, each of the groups is matched to one pixel in the low-resolution color display from each group and a set of RGB values is extracted by selecting three pixels from the seven. The R value is extracted from the first selected pixel, the G value is extracted from the second selected pixel, and the B value is extracted from the third selected value. The final step is to then display a specific color corresponding to the assigned RGB values. In addition, the three pixels from each group are selected by obtaining the floor integer value N of the result of the division of the ratio value E by 3; then by extracting a first primary color value from the (i)th pixel, where i=1 or 2, in the group; by extracting a second primary color value from the (i+N)th pixel in the group; and by extracting a third primary color value from the (i+2N)th pixel in the group. The order of the RGB extraction is not limited to RGB, and can be RBG or others. This process is repeated until all the groups in the same horizontal line and all the horizontal lines in the original digital color image are matched to the pixels in the LCD. The color extraction from the groups in the second line is preferably shifted in the RGB order so as to allow the resulting color in the displayed image on the LCD to be smoother. The method of the invention allows the resulting image on the low-resolution LCD to be high in fidelity when compared to the original high-resolution image. The color transition from one pixel to the neighboring one is therefore smooth and without abrupt changes that would otherwise cause discontinuity to the color rendition of the resulting image on the LCD. Moreover, the featured RGB extraction method can be performed without complex software/hardware means.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 2:
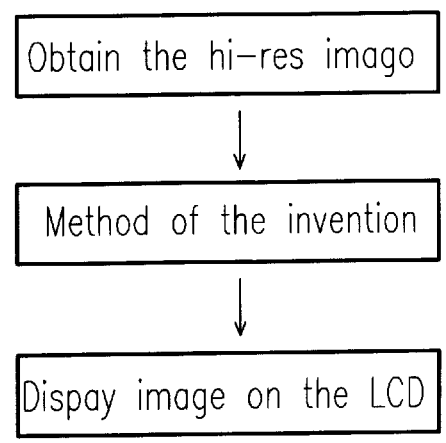
FIG. 2 is a flow diagram showing the procedural steps involved in the method according to the invention for displaying an original high-resolution image on a low-resolution LCD.

FIG. 2 is a flow diagram showing the procedural steps of the method according to the invention for displaying an original high-resolution digital color image on a low-resolution color display such as an LCD.

In the method of the invention, the first step is to obtain the original high-resolution digital color image. Then, the second step is to perform the characterized RGB extraction algorithm so as to transform the high-resolution image into a low-resolution form that can be displayed on the LCD. In the case of displaying an original 640×480 VGA color image on a 280×220 LCD, each pixel in the low-resolution LCD represents a group of 7 consecutive pixels in the high-resolution image, where the number 7 is obtained by rounding up the value of 640/93 to the nearest integer number. In accordance with the invention, three pixels are selected from each group of 7 consecutive pixels in each horizontal line of the high-resolution image, and then the RGB values for each pixel in the low-resolution display are extracted respectively from these three pixels. For example the R value of the first pixel, the G value of the second pixel, and the B value of the third pixel are extracted out and then combined collectively as the RGB value of the corresponding pixel in the low-resolution LCD. The third step is then to use the thus obtained RGB values to drive each corresponding pixel in the LCD. Further details of this method will be disclosed in the following.

Figure 3A:
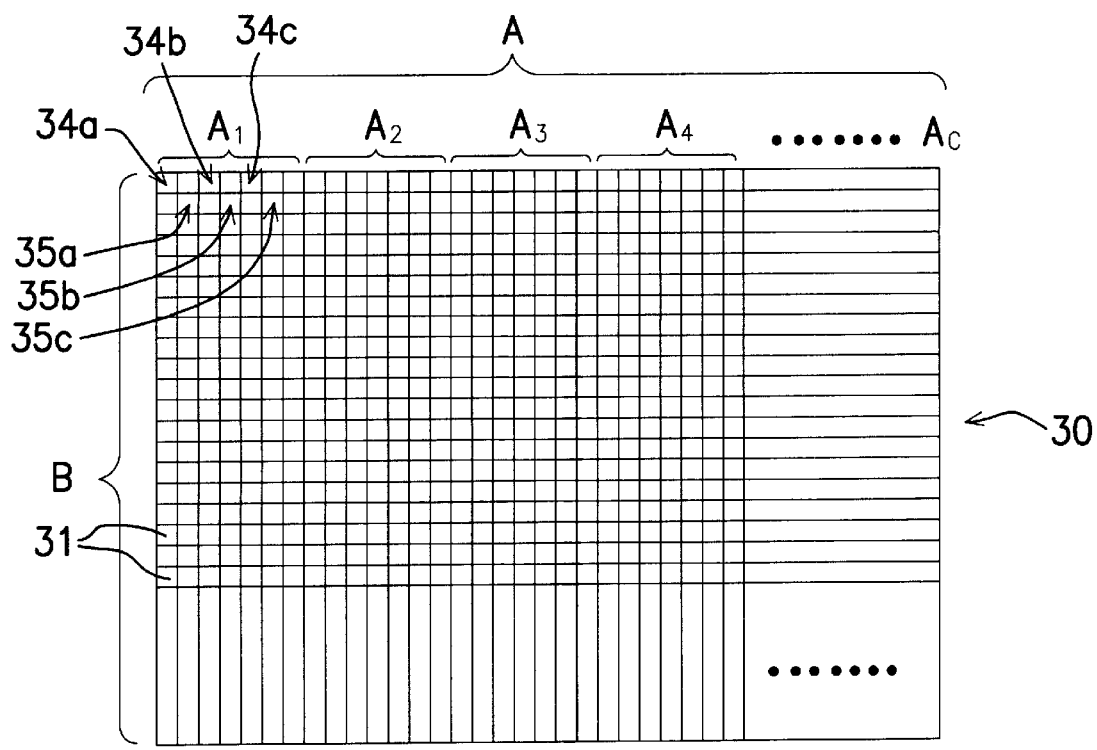
FIG. 3A is a schematic diagram illustrating a high-resolution pixel array.
Figure 3B:
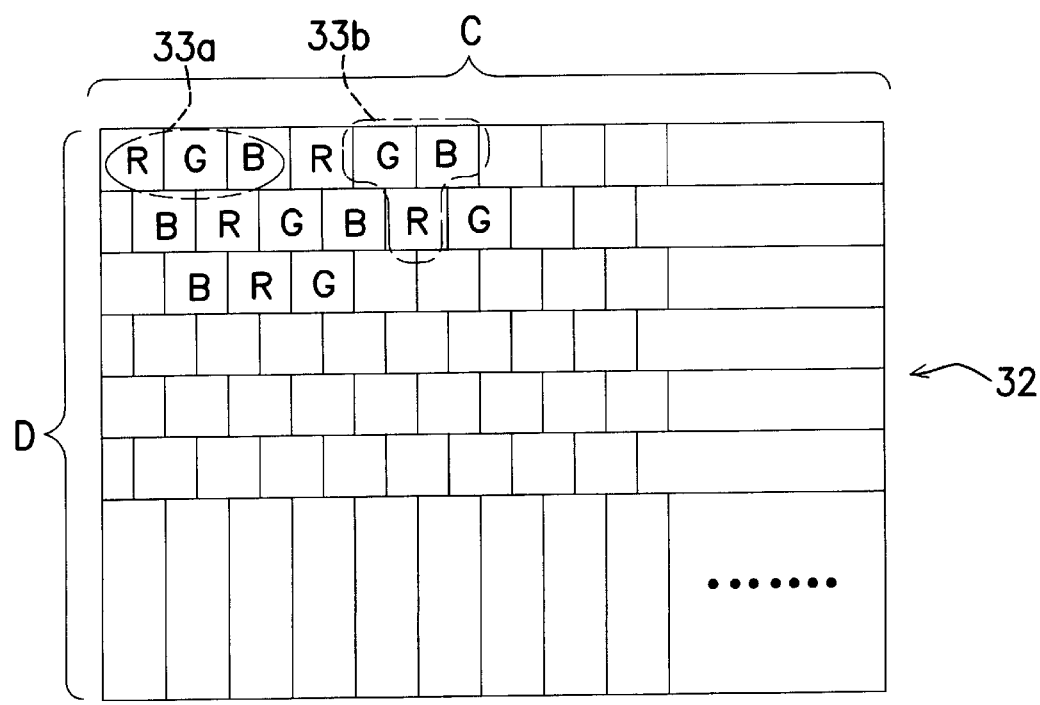
FIG. 3B is a schematic diagram illustrating a low-resolution display which can display the image from the high-resolution pixel array of FIG. 3A through the method of the invention.

FIG. 3A is a schematic diagram illustrating a high-resolution pixel array 30 which is an A×B array of pixels 31. In the case of VGA, A×B=640×480, which indicates that each horizontal line of the high-resolution pixel array 30 includes 640 pixels and each vertical line of the same includes 480 pixels. Each pixel 31 is composed of three dots respectively used to display the RGB components of a specific color. Moreover, FIG. 3B shows a low-resolution LCD 32 with a resolution of C×D, where <A and D <B. Typically, C×D=93×220, which indicates that each horizontal line of the low-resolution LCD 32 includes 93 pixels and each vertical line of the same includes 220 pixels. In the low-resolution LCD 32 of FIG. 3B, each pixel can be a group of three consecutive dots in the same horizontal line, such as the three dots collectively indicated by the refernece numeral 33a, or each pixel can be a group of three dots with two of them in one line and the third in the next line, such as the three dots collectively indicated by the reference number 33b. The LCD 32 can display monochrome images in the nominated resolution of 280×220, but will display color images in a reduced resolution of only 93×220, where 93≈280/3). This is because that in the latter case, three dots will be used in combination to display the respective RGB components of a specific color in the image.

In accordance with the invention, a ratio value E is obtained by rounding up the result of the division of A by C to the nearest integer. For example, in the case of A×B= 640×480 and C×D=93×220, E=ROUND(640/93)=ROUND (6.88)=7. Referring to FIG. 3A, the pixels in each horizontal line in the high-resolution pixel array 30 are grouped in a unit of E=7 into a number of groups $A_1, A_2, A_3, A_4, \ldots A_c$, with each group corresponding to one pixel in the LCD 32. From each group, three alternate pixels are selected. For example, from the group $A_1$, the first, the third, and the fifth pixels (as designated by the reference numerals 34a, 34b, 34c) are selected. Then, the R value of the first selected pixel 34a, the G value of the second selected pixel 34b, and the B value of the third selected pixel 34c are extracted out and used in combination as the RGB values of the corresponding pixel in the LCD 32. As a general rule, assume N=FLOOR (E/3), where FLOOR(x) represents the arithmetic operation that obtains the largest integer number that is not greater than x; then every other N pixels in each group are selected, i.e., the (i)th, the (i+N)th, and the (i+2N)th pixels in each group are selected, where i=1 or 2. In the case of E=7, N=FLOOR(7/3)=FLOOR(2.33)=2. Therefore, the (1)st, the (3)rd, and the (5)th pixels in the group $A_1$ are selected.

In the odd-numbered lines, the (2nd, the (4)th, and the (6)th pixel, i.e., those indicated by the reference numerals 35a, 35b, 35c, in each group are selected. The RGB values extracted respectively from these three pixels are also shifted in order. For example, since the order R-G-B is used in the group $A_1$ in the first line, the RGB extraction from each group in the second line is in the order of B-R-G; i.e.; the B value of the first selected pixel 35a, the R value of the second selected pixel 35b, and the G value of the third selected pixel 35c are extracted out and then used in combination as the RGB values of the corresponding pixel in the LCD 32. Here, the separation between each neighboring pair of the selected pixels is also N=FLOOR(7/3)=2 pixels.

Figure 1A:
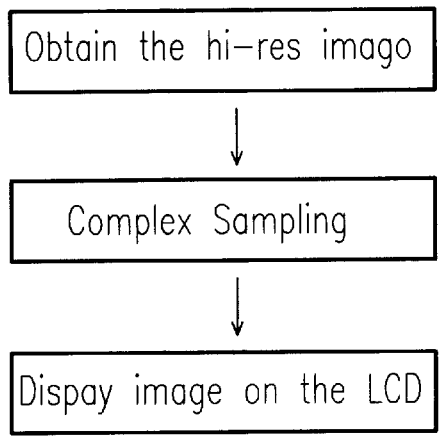
FIG. 1A is a flow diagram showing the procedural steps of a conventional method for displaying an original high-resolution image on a low-resolution LCD.
Figure 1B:
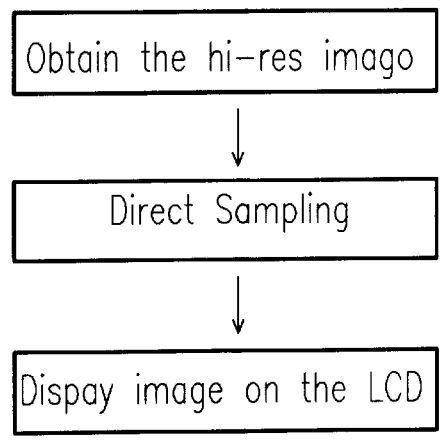
FIG. 1B is a flow diagram showing the procedural steps of another conventional method for displaying an original high-resolution image on a low-resolution LCD.

From the foregoing description, it is apparent that the invention has an advantage over the prior art in that it is able to reproduce a high-resolution image on a low-resolution LCD, with high fidelity to the original image. The conventional method of FIG. 1B selects only one pixel from each group of 7 pixels and then uses the RGB values of this pixel to represent the RGB values of the corresponding pixel in the LCD. In contrast, the invention selects three alternate pixels from the same group and then uses the respective RGB values of the three pixels as the RGB values of the corresponding pixel in the LCD. The problem of abrupt changes in the color rendition of the image displayed in the LCD will thus be improved. By the invention, the resulting image on the LCD is thus smoother in color transitions from one pixel to the next.

The foregoing process is repeated until all the groups in the high-resolution pixel array 30 are matched to the corresponding pixels in the LCD 32. The RGB values extracted from each group are used in combination to drive the corresponding pixel in the LCD 32.

Figure 4A:
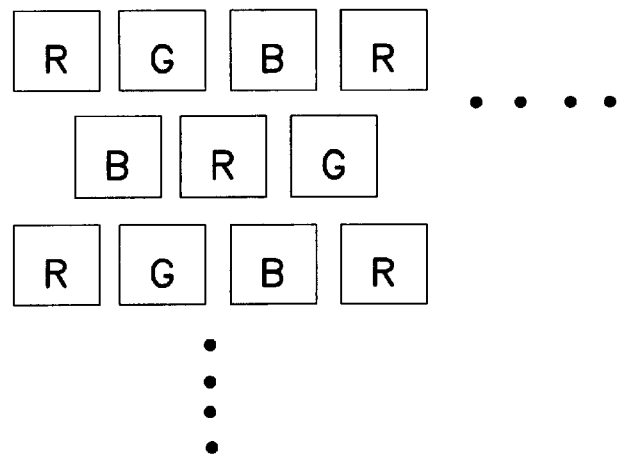
FIGS. 4A–4C are schematic diagrams used to depict the various other types of LCDs on which the method of the invention can be utilized.
Figure 4B:
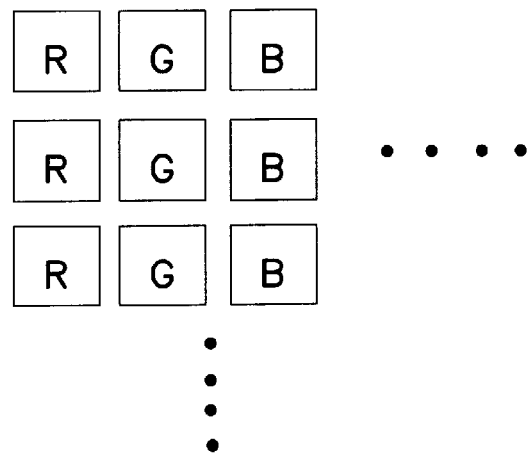
Figure 4C:
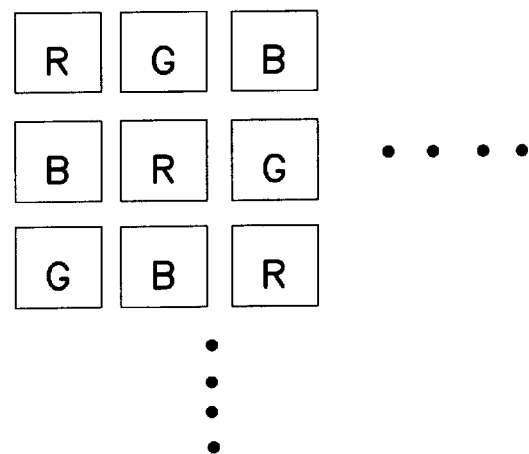

The method of the invention is not limited to use on the above-mentioned type of LCD. It can also be utilized on other types of LCDs, as respectively shown in FIGS. 4A–4C. FIG. 4A shows a delta-type LCD in which the RGB dots for each pixel are arranged in a delta-like pattern; FIG. 4B shows a stripe-type LCD in which the RGB dots for each pixel are arranged in a stripe-like pattern; and FIG. 4C shows a mosaic-type LCD in which the RGB dots for each pixel are arranged in a mosaic-like pattern.

In conclusion, the method of the invention has the following advantages over the prior art.

(1) First, the invention provides a featured RGB extraction method that extracts the three RGB values for the corresponding pixel in the LCD respectively from three alternate pixels in each group in the pixel array. This allows the resulting image on the low-resolution LCD to be high in fidelity when compared to the original high-resolution image. The color transition from one pixel to the neighboring one is therefore smooth and without abrupt changes that would cause discontinuous and thus displeasing effects in the color rendition of the resulting image on the LCD. Moreover, the featured RGB extraction method can be performed without complex software/hardware means.

(2) Second, the method of the invention has a wide of range of utilization, including the delta-type LCDs, the strip-type LCDs, and the mosaic-type LCDs.

(3) The invention can be applied to one-dimensional cases as well as two-dimensional cases. For example, the invention can be used to match each group in the horizontal line in the high-resolution pixel array 30 to one pixel in the low-resolution LCD 32, and it can also be used to match each square block in the high-resolution pixel array 30 to one pixel in the LCD 32.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for displaying an original digital color image of a resolution of A×B on a color display of a resolution of C×D, where A, B, C, D are positive integer numbers and A>C and B>D, said method comprising the steps of:

(1) grouping the pixels of the original digital color image into a plurality of groups equal in number to the pixels in the color display;

(2) matching each of the groups to one pixel in the color display;

(3) from each group, extract one set of RGB values respectively from three different pixels in the group;

(4) assigning the RGB values extracted from each group to the corresponding pixel in the color display; and (5) driving the color display to display the image with the assigned RGB values.

2. The method of claim 1, wherein the color display is an LCD.

3. The method of claim 1, wherein the resolution A×B indicates that each horizontal line in the original digital color image consists of A pixels and each vertical line in the same consists of B pixels.

4. The method of claim 1, wherein the resolution C×D indicates that each horizontal line in the color display consists of C pixels and each vertical line in the same consists of C pixels.

5. The method of claim 1, further comprising the substeps of:

obtaining a ratio value E by rounding up the result of the division of A by C to the nearest integer number;

grouping the pixels in each horizontal line of the original digital color image in a unit of E pixels into the plurality of groups; and performing the following substeps for each of the groups:
selecting three pixels from each group, and then
from a first one of the three pixels, extracting the R value thereof;
from a second one of the three pixels, extracting the G value thereof;
from a third one of the three pixels, extracting the B value thereof.

6. The method of claim 5, wherein the R value is used by the corresponding pixel to display a corresponding level of the red component.

7. The method of claim 5, wherein the G value is used by the corresponding pixel to display a corresponding level of the green component.

8. The method of claim 5, wherein the B value is used by the corresponding pixel to display a corresponding level of the blue component.

9. The method of claim 5, wherein the three pixels from each group are selected by the steps of:

obtaining the floor integer value N from the result of the division of the ratio value E by 3; and from the (i)th, where i=1 or 2, pixel in the group, extracting the R value thereof;

from the (i+N)th pixel in the group, extracting the G value thereof; and from the (i+2N)th pixel in the group, extracting the B value thereof.

10. The method of claim 5, wherein the three pixels from each group are selected by the steps of:

obtaining the floor integer value N of the result of the division of the ratio value E by 3; and from the (i)th, where i=1 or 2, pixel in the group, extracting the R value thereof;

from the (i+N)th pixel in the group, extracting the B value thereof; and from the (i−2N)th pixel in the group, extracting the G value thereof.

11. A method for displaying an original digital color image of a resolution of A×B on a color display of a resolution of C×D, where A, B, C, D are positive integer numbers and A>C and B>D, said method comprising the steps of:

(1) grouping the pixels of the original digital color image into a plurality of groups equal in number to the pixels in the color display;

(2) matching each of the groups to one pixel in the color display;

(3) from each group, extract one set of RGB values respectively from three different pixels in the group in such a manner that:

from a first one of the three pixels, extracting the R value thereof;

from a second one of the three pixels, extracting the G value thereof; and from a third one of the three pixels, extracting the B value thereof;

(4) assigning the RGB values extracted from each group to the corresponding pixel in the color display; and (5) driving the color display to display the image with the assigned RGB values.

12. The method of claim 11, wherein the color display is an LCD.

13. The method of claim 11, wherein the resolution A×B indicates that each horizontal line in the original digital color image consists of A pixels and each vertical line in the same consists of B pixels.

14. The method of claim 11, wherein the resolution C×D indicates that each horizontal line in the color display consists of C pixels and each vertical line in the same consists of C pixels.

15. The method of claim 11, wherein the R value is used by the corresponding pixel to display a corresponding level of the red component, the G value is used by the corresponding pixel to display a corresponding level of the green component, and the B value is used by the corresponding pixel to display a corresponding level of the blue component.

16. The method of claim 11, wherein the three pixels from each group are selected by the steps of:

obtaining the floor integer value N of the result of the division of the ratio value E by 3 from the (i)th pixel in the group, extracting the R value thereof;

from the (i+N)th pixel in the group, extracting the G value thereof; and from the (i+2N)th pixel in the group, extracting the B value thereof.

17. The method of claim 11, wherein the three pixels from each group are selected by the steps of:

obtaining the floor integer value N of the result of the division of the ratio value E by 3 from the (i)th pixel in the group, extracting the R value thereof;

from the (i+N)th pixel in the group, extracting the B value thereof; and from the (i+2N)th pixel in the group, extracting the G value thereof.

* * * * *